United States Patent
Engström et al.

(10) Patent No.: US 6,543,290 B1
(45) Date of Patent: Apr. 8, 2003

(54) SINGLE DIAPHRAGM DIFFERENTIAL PRESSURE SENSOR HAVING A MEASURING SPINDLE ATTACHED TO THE DIAPHRAGM

(75) Inventors: Chris Engström, Uppsala (SE); Åke Eriksson, Tullinge (SE)

(73) Assignee: Eletta AB, Huddinge (SE)

( * ) Notice: Subject to any disclaimer, the term of this patent is extended or adjusted under 35 U.S.C. 154(b) by 0 days.

(21) Appl. No.: 09/567,122

(22) Filed: May 8, 2000

(30) Foreign Application Priority Data

May 6, 1999 (SE) .............................................. 9901640

(51) Int. Cl.[7] .............................................. G01L 7/08
(52) U.S. Cl. .......................................... 73/715; 73/720
(58) Field of Search .......................... 73/715, 716, 717, 73/720, 861.42, 861.45, 861.52, 861.64

(56) References Cited

U.S. PATENT DOCUMENTS 2,707,393 A * 5/1955 Hardway, Jr. ............. 73/861.48
3,444,736 A   5/1969 Stedman
4,221,134 A   9/1980 Ekstrom, Jr.
4,563,901 A * 1/1986 Singh ........................... 73/706
4,878,385 A * 11/1989 Lloyd ......................... 310/324

FOREIGN PATENT DOCUMENTS

GB        2090417        7/1982

* cited by examiner

Primary Examiner—Harshad Patel
Assistant Examiner—Corey D. Mack
(74) Attorney, Agent, or Firm—Walter Ottesen

(57) ABSTRACT

In a flowmeter for measuring fluid flow, fluid passes through a primary element (20) in which the pressure on respective sides of the restriction (2a) acts on respective sides of the diaphragm (11) mounted in a diaphragm housing (3). The diaphragm, in turn, acts on a measuring element (17) provided with strain gauges (27) connected to a measuring bridge (5). The signals from the measuring bridge (5) can be used to indicate the flow through the orifice plate, for example, on an indicating instrument (7), or otherwise to record changes in the flow or control the flow to a desired value by means of a control system.

8 Claims, 4 Drawing Sheets

SINGLE DIAPHRAGM DIFFERENTIAL PRESSURE SENSOR HAVING A MEASURING SPINDLE ATTACHED TO THE DIAPHRAGM

FIELD OF THE INVENTION

The invention relates to a device for measuring the flow or pressure of a fluid. The fluid passes through a primary element in which the pressure on respective sides of a restriction in the primary element acts on respective sides of a diaphragm mounted in a diaphragm housing. The diaphragm, in turn, acts on a measuring element provided with strain gauges and connected to a measuring bridge which indicates the flow through the primary element. In pressure measurements, the fluid pressure acts on one side of the diaphragm only.

BACKGROUND OF THE INVENTION

In previously known flowmeters based on the strain gauge principle, such as in U.S. Pat. No. 2,707,393, which is designed to measure whether and to what degree a flow is pulsating, the movements of the diaphragm are transferred to the body housing and the strain gauges by means of a linkage, which gives rise to unwanted hysteresis effects as the flow increases and decreases. Since the strain gauges are in direct contact with the fluid, the results of measurement are also affected by changes in fluid temperature.

The above is true, for example, of U.S. Pat. No. 3,444,736. Here, a complicated arrangement is disclosed wherein the diaphragm, which actuates the strain gauges, is surrounded by silicone oil and is enclosed between two further diaphragms which, in turn, detect the pressure differential in a venturi tube. This device also causes unwanted hysteresis effects and, according to the disclosure of this patent, affords a flow ratio of only 3:1. Furthermore, in both of these devices, the electrical connections from the strain gauges, which are immersed in pressurized fluid, must be provided with fully sealed electrical penetrations.

SUMMARY OF THE INVENTION

It is an object of the invention to eliminate the disadvantages associated with previously known devices and to provide a flowmeter of simple construction which is entirely free of hysteresis effects as the flow increases and decreases.

The flowmeter of the invention is for measuring the flow of fluid flowing through a primary element. The flowmeter includes: a restriction mounted in the primary element through which the fluid flows thereby generating a differential pressure across the restriction; a housing; a diaphragm mounted in the housing; the housing being connected to respective sides of the restriction so as to permit the differential pressure to act on the diaphragm; a diaphragm spindle attached to the diaphragm so as to be displaced in response to changes in the differential pressure; a measuring element defining a hollow space; a finger arranged in the hollow space so as to extend transversely to the diaphragm spindle; the finger being fixedly connected to the measuring element at the lower end of the hollow space; connecting means for connecting the diaphragm spindle to the finger for transmitting the movements of the diaphragm to the finger which, in turn, imparts deflections to the measuring element; the measuring element including strain gauges mounted thereon for sensing the deflections transmitted to the measuring element via the finger; and, a measuring bridge incorporating the strain gauges to provide an electrical signal indicative of the flow through the restriction.

Measured values, which are completely independent of temperature changes in the fluid, are provided by the flowmeter of the invention because the strain gauges are located completely separate from the fluid and are mounted symmetrically on a measuring element. A further advantage is that the fluid cannot damage the strain gauges through its aggressivity, toxicity, temperature, pressure or abrasive properties. This is achieved by an arrangement in which a diaphragm mounted in a diaphragm housing is acted on by the higher and lower pressures present at respective sides of a primary element, and in which a diaphragm spindle extends at right angles to the diaphragm proper, one end of the spindle being attached to the center of the diaphragm and the other end being provided with a free-fit hole. One end of a finger is held, without play, by an adjusting screw located centrally in the hole in the free end of the diaphragm spindle. The finger extends downwardly through a hollow measuring element, to which it is fixed at the lower end. The measuring element, the hollow interior of which is open to the fluid on one side of the diaphragm, is bolted to one side of the diaphragm housing in a fluid-tight manner. Since the diaphragm tends to move towards the side on which the lower pressure acts, it exerts a pulling or pushing action on the diaphragm spindle depending on the side on which the high pressure is allowed to act. The diaphragm spindle, in turn, deflects the measuring element via the finger attached to it. Strain gauges bonded to the outside of the measuring element are connected, in a conventional manner, to a Wheatstone bridge, which converts the changes in resistance of the strain gauges into an electrical signal. This signal can be used to provide a flow-calibrated reading on an indicating instrument and/or otherwise to record changes in flow or to control the flow at a desired value with the aid of a known control system. The invention also affords a flow ratio of 10:1 or 100:1 when measuring pressure only, which is significantly higher than that of previously known devices.

BRIEF DESCRIPTION OF THE DRAWINGS

The invention will be described with reference to the drawings wherein.

DESCRIPTION OF THE PREFERRED EMBODIMENTS OF THE INVENTION

Figure 1:
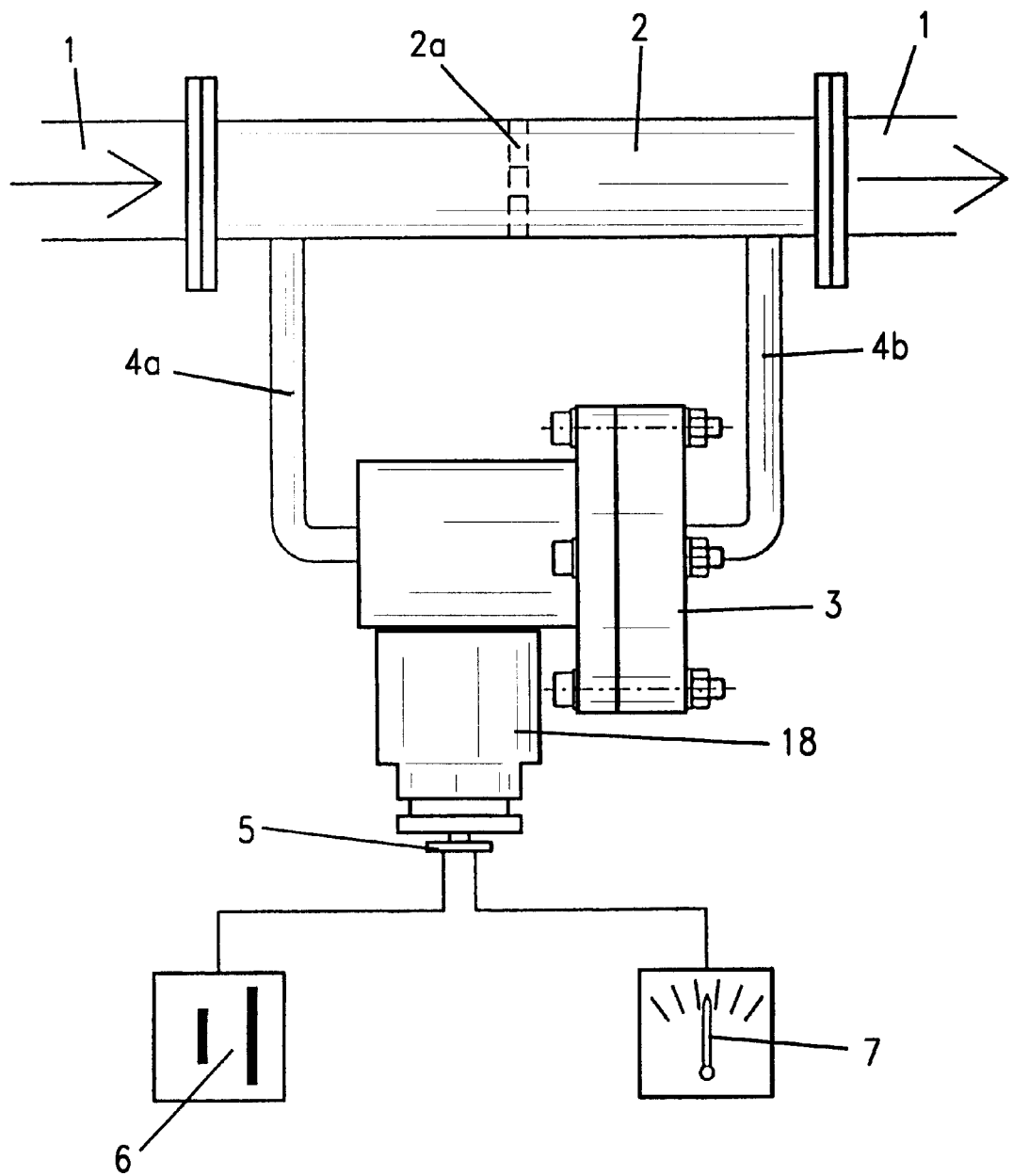
FIG. 1 is a schematic, in section, of a flowmeter according to an embodiment of the invention.

FIG. 1 shows a pipe line 1 containing the medium whose flow is to be measured and which passes through a restriction 2a in a primary element 2. The fluid is connected to a diaphragm housing 3 by the instrument lines (4a, 4b) on respective sides of the restriction 2a. A branch 18 houses a measuring element 17 (FIG. 2) and is bolted to the diaphragm housing. A measuring bridge 5 is attached to branch 18 and is complete with its power supply 6 and an indicating instrument 7 showing the flow in suitable units.

Figure 2:
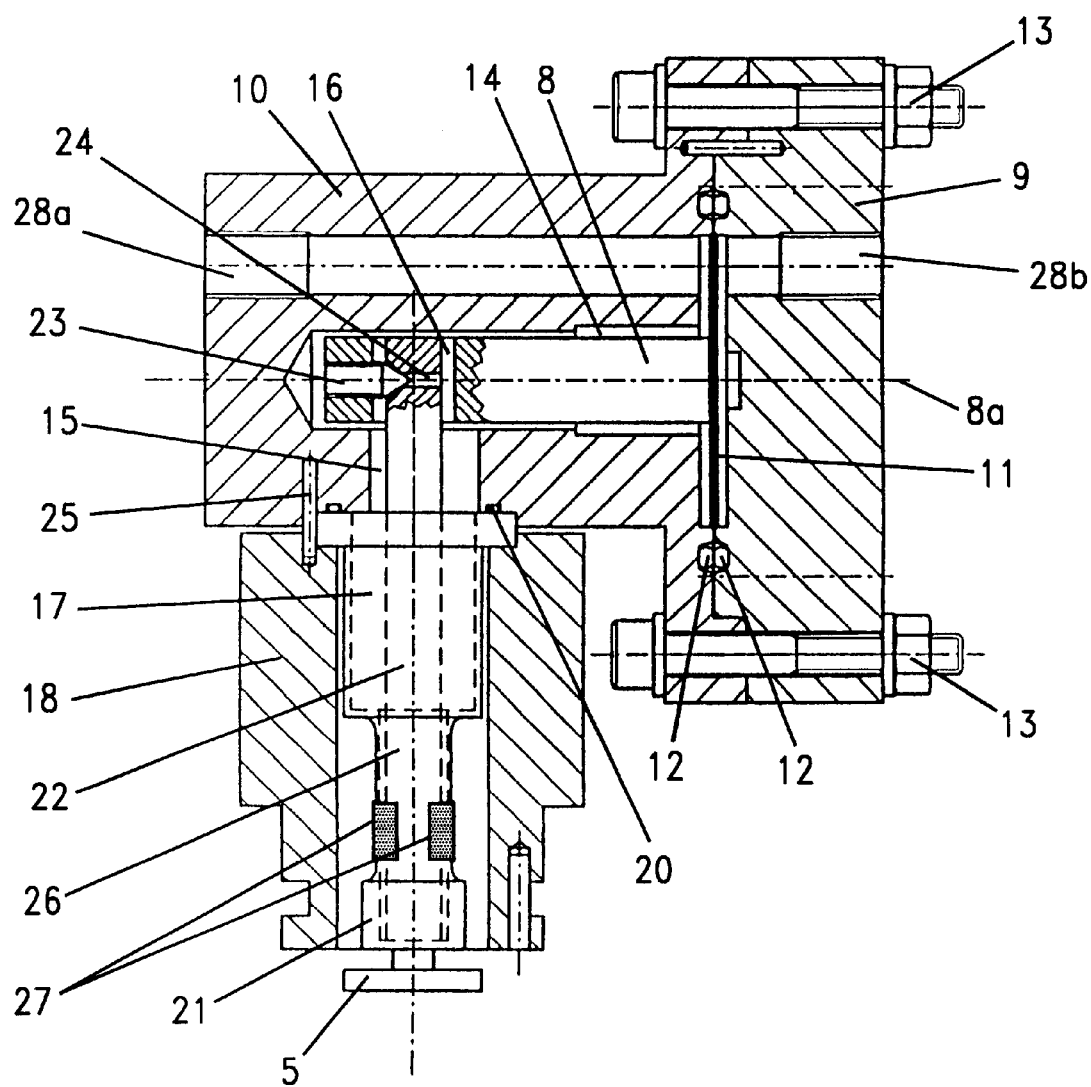
FIG. 2 is a vertical section through the diaphragm housing of a flowmeter of FIG. 1.

FIG. 2 is a vertical section through the flowmeter diaphragm housing 3 which includes right-hand section 9 and left-hand section 10. A diaphragm 11 is clamped between sections 9 and 10 in a fluid-tight manner, using O-ring-seals 12, by means of bolts 13.

A diaphragm spindle 8, which extends freely through a hollow space 14 in the left-hand section 10 of the diaphragm housing, is attached, at one end, to the center of the diaphragm 11. The other end of the spindle 8 is provided with a bore 16 drilled at right angles to the center line 8a of the diaphragm spindle 8. The left-hand section 10 of the diaphragm housing is also provided with a hollow passage 15 whose center coincides with that of bore 16.

A hollow measuring element 17 is arranged centrally around the hollow passage 15 and is secured in position in a fluid-tight manner by branch 18 by means of bolts 19 (FIG. 3) and O-ring seal 20. A finger 22 attached to the lower end 21 of the measuring element 17 is free to move in the hollow interior of the measuring element and in the diaphragm spindle 8. The finger 22 of measuring element 17 extends through the hollow passage 15 and centrally through the bore 16 in the diaphragm spindle. The free end of the diaphragm spindle 8 is provided with a central, threaded hole fitted with an adjusting screw 23, the tapered end of which joins the diaphragm spindle 8 and finger 22, without play, at a hole 24 drilled through the finger in line with the center line 8a of the diaphragm spindle 8. The measuring element 17 is aligned relative to the left-hand section 10 of the diaphragm housing by means of a guide pin 25 to ensure that the hole 24 in the finger 22 is aligned with the center line of the diaphragm housing when installing the measuring element. Strain gauges 27 are fitted in pairs on the outer, waisted mid-section 26 of the measuring element 17 and are connected electrically to the measuring bridge 5. Furthermore, the right-hand and left-hand sections, respectively, of the diaphragm housing are provided with threaded holes 28a and 28b for connecting the instrument lines 4a and 4b from the restriction primary element 2.

Figure 3:
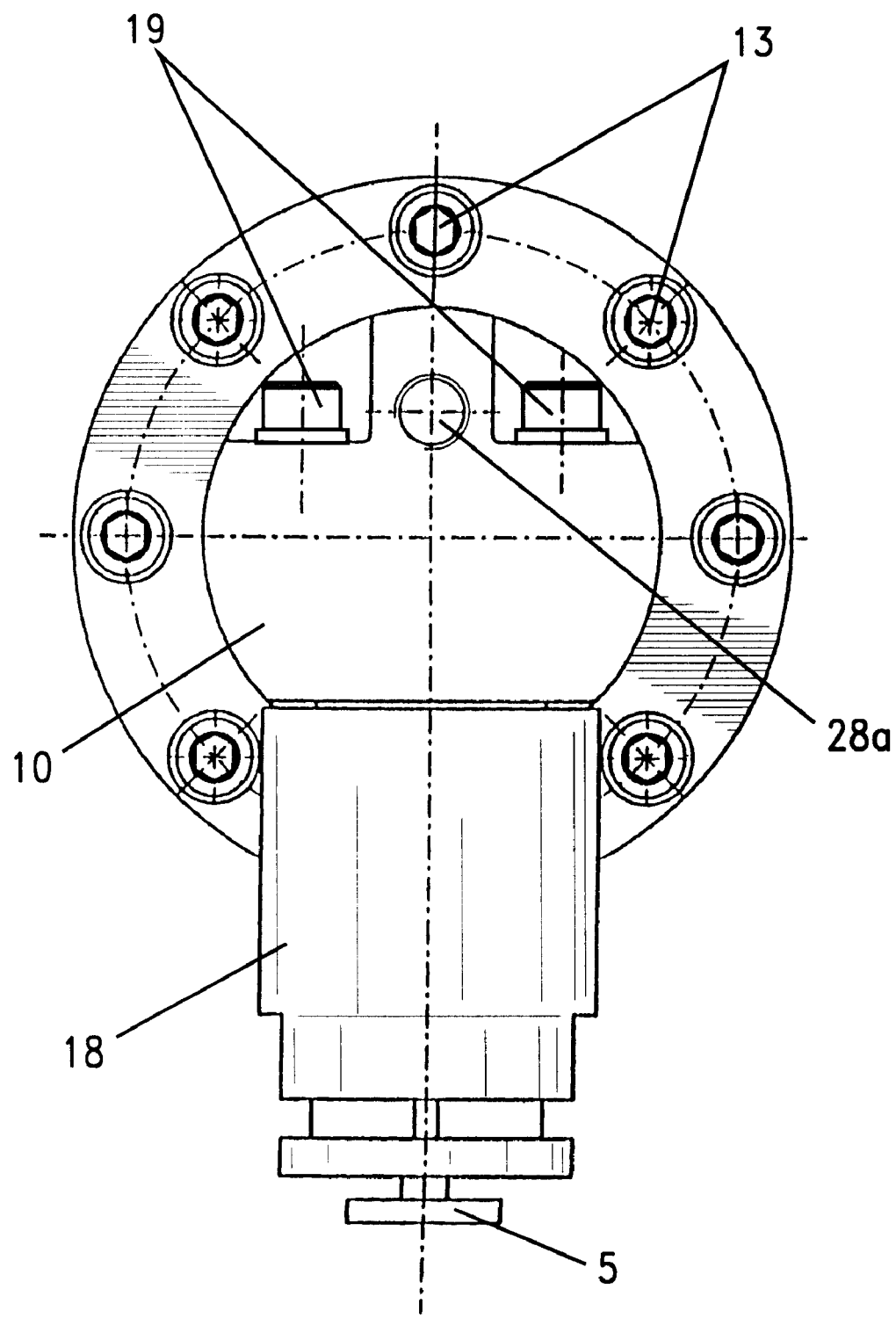
FIG. 3 is an end view of the diaphragm housing.

FIG. 3 is an end view of the left-hand section 10 of the diaphragm housing 3 showing the branch 18 secured by the bolts 19. The right-hand and left-hand sections of the diaphragm housing are joined by the bolts 13. The measuring bridge is identified by reference numeral 5.

Figure 4:
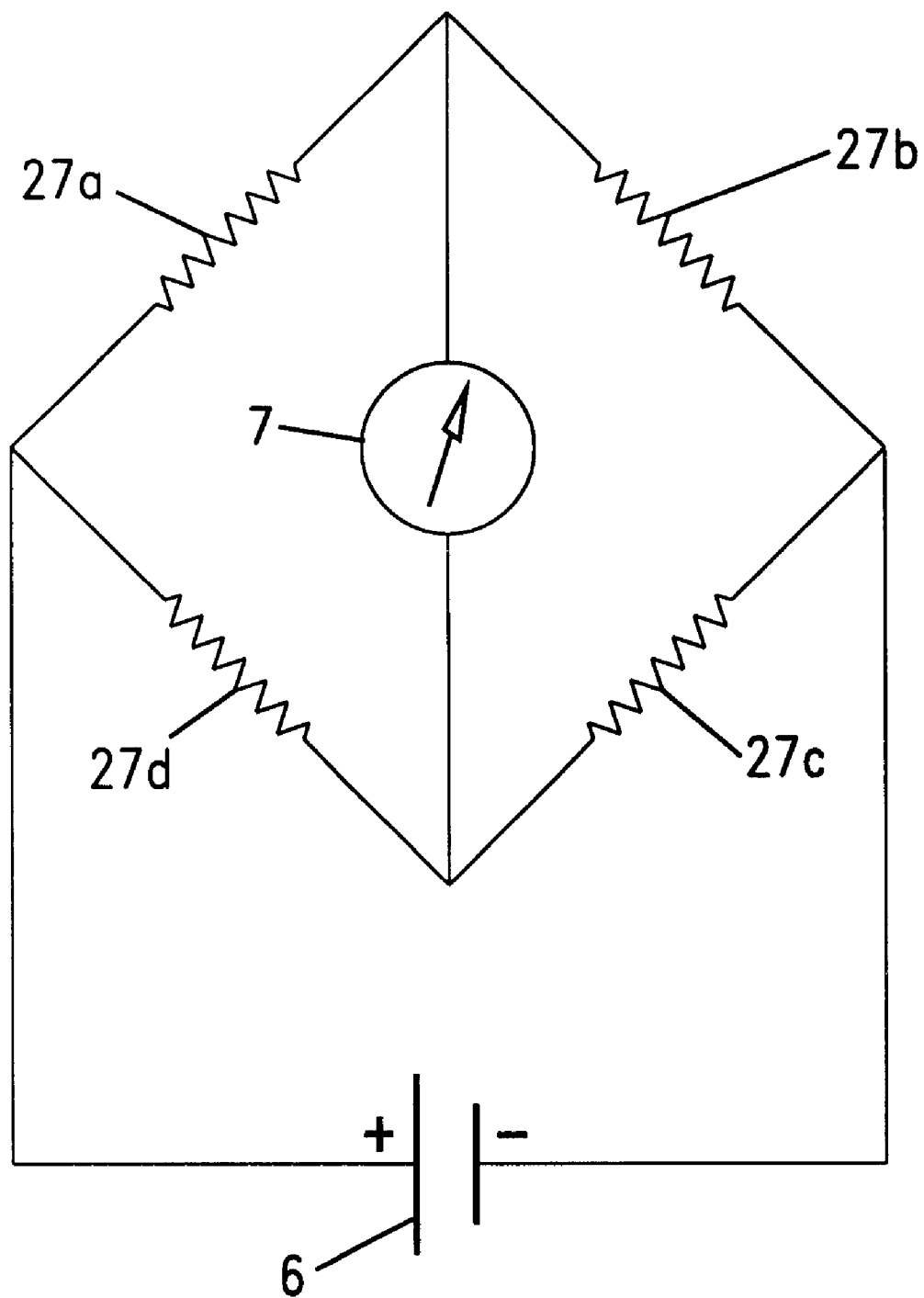
FIG. 4 is a schematic showing four strain gauges connected into a Wheatstone bridge.

In a preferred embodiment, four strain gauges (27a, 27b, 27c, 27d) are provided and connected into a Wheatstone bridge as shown in FIG. 4.

Since only the differential pressure is measured, the invention is completely independent of the static pressure of the fluid and of any changes in pressure, and is not limited to the embodiment described, but is also valid for variants of the embodiment shown. The invention may also be used to measure both liquid and gas flows. In addition, the invention may be used to measure the static pressure in a pipe line by connecting one of the instrument lines (4a, 4b) to the pipe line in which the pressure is to be measured. The invention may further be used to measure the level in a vessel when the specific weight of the liquid is known and the liquid pressure is measured at the bottom of the vessel. If the vessel is closed and under higher pressure than the ambient pressure, the second instrument line 4 of the invention should be connected to the gas phase (that is, to the top of the vessel).

It is understood that the foregoing description is that of the preferred embodiments of the invention and that various changes and modifications may be made thereto without departing from the spirit and scope of the invention as defined in the appended claims.

What is claimed is:

1. A flowmeter for measuring the flow of fluid flowing through a primary element, the flowmeter comprising:
   a restriction mounted in said primary element through which the fluid flows thereby generating a differential pressure across said restriction;
   a housing;
   a single diaphragm mounted in said housing;
   said housing being connected to respective sides of said restriction so as to permit said fluid to act directly on respective sides of said single diaphragm thereby enabling said differential pressure to act directly on said diaphragm;
   a diaphragm spindle attached to said single diaphragm so as to be displaced in response to changes in said differential pressure;
   a measuring element defining a hollow space having a lower end;
   a finger arranged in said hollow space so as to extend transversely to said diaphragm spindle;
   said finger being fixedly connected to said measuring element at the lower end of said hollow space;
   connecting means for connecting said diaphragm spindle to said finger for transmitting the movements of said diaphragm to said finger which, in turn, imparts deflections to said measuring element;
   said measuring element including strain gauges mounted thereon for sensing said deflections transmitted to said measuring element by said finger;
   a measuring bridge incorporating said strain gauges to provide an electrical signal indicative of said flow through said restriction;
   said diaphragm spindle having a free end and defining a center longitudinal axis; and,
   said connecting means including:
      a bore formed in said diaphragm spindle for accommodating said finger therein;
      a hole formed in said finger in line with said center longitudinal axis; and,
      an adjusting screw threadably engaging said free end of said diaphragm spindle and said adjusting screw having a tapered tip which engages said hole and holds said finger without play.

2. The flowmeter of claim 1, said adjusting screw engaging said finger to hold said finger in tension.

3. The flowmeter of claim 1, said measuring element being a cylindrical measuring element and said finger being at right angles to said center longitudinal axis.

4. The flowmeter of claim 1, said measuring element having a waisted section and said strain gauges being mounted on said waisted section.

5. The flowmeter of claim 1, said measuring element being attached to said housing and said fluid filling said measuring element; and, said strain gauges being mounted on the outside wall surface of said measuring element so as not to be subjected to said fluid.

6. The flowmeter of claim 1, wherein said strain gauges are four in number.

7. The flowmeter of claim 1, wherein said single diaphragm is a completely flat diaphragm.

8. A flowmeter for measuring the flow of fluid flowing through a primary element, the flowmeter comprising:
   a restriction mounted in said primary element through which the fluid flows thereby generating a differential pressure across said restriction;
   a housing;
   a single diaphragm mounted in said housing;
   said housing being connected to respective sides of said restriction so as to permit said fluid to act directly on respective sides of said single diaphragm thereby enabling said differential pressure to act directly on said diaphragm;

a diaphragm spindle attached to said single diaphragm so as to be displaced in response to changes in said differential pressure;

a measuring element defining a hollow space having a lower end;

a finger arranged in said hollow space so as to extend transversely to said diaphragm spindle;

said finger being fixedly connected to said measuring element at the lower end of said hollow space;

connecting means for connecting said diaphragm spindle to said finger for transmitting the movements of said diaphragm to said finger which, in turn, imparts deflections to said measuring element;

said measuring element including strain gauges mounted thereon for sensing said deflections transmitted to said measuring element by said finger;

a measuring bridge incorporating said strain gauges to provide an electrical signal indicative of said flow through said restriction; and, biasing means for applying a biasing force to said finger to hold said finger in tension.

* * * * *